April 21, 1953  F. B. DICKINSON  2,635,800
AUTOMATIC STOPPERING MACHINE
Filed June 2, 1950  7 Sheets-Sheet 1

F. B. Dickinson
INVENTOR
BY C. A. Snow & Co.
ATTORNEYS.

April 21, 1953 F. B. DICKINSON 2,635,800
AUTOMATIC STOPPERING MACHINE
Filed June 2, 1950 7 Sheets-Sheet 4

F. B. Dickinson
INVENTOR
BY C.A.Snow&Co.
ATTORNEYS.

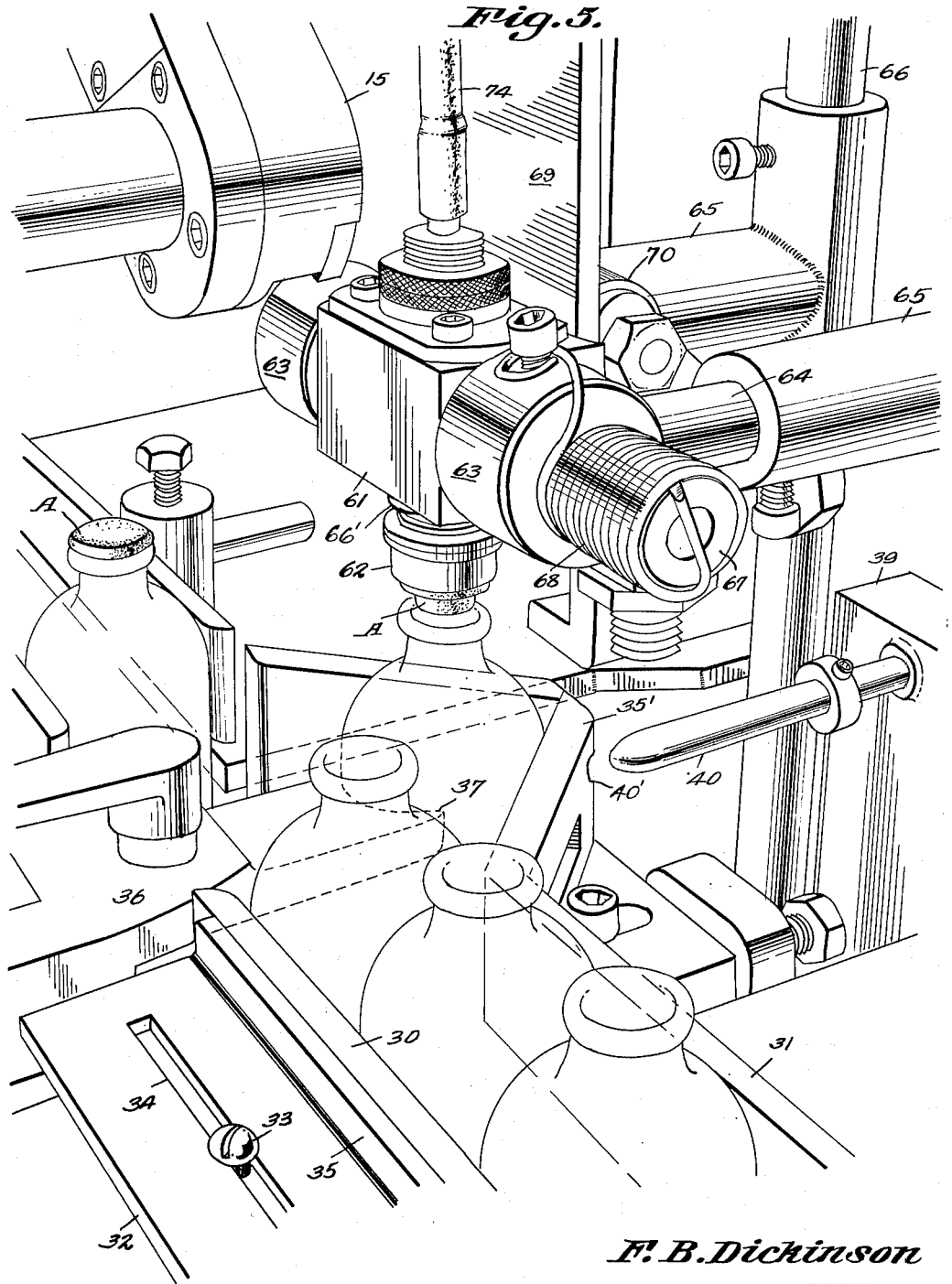

April 21, 1953 F. B. DICKINSON 2,635,800
AUTOMATIC STOPPERING MACHINE
Filed June 2, 1950 7 Sheets-Sheet 6
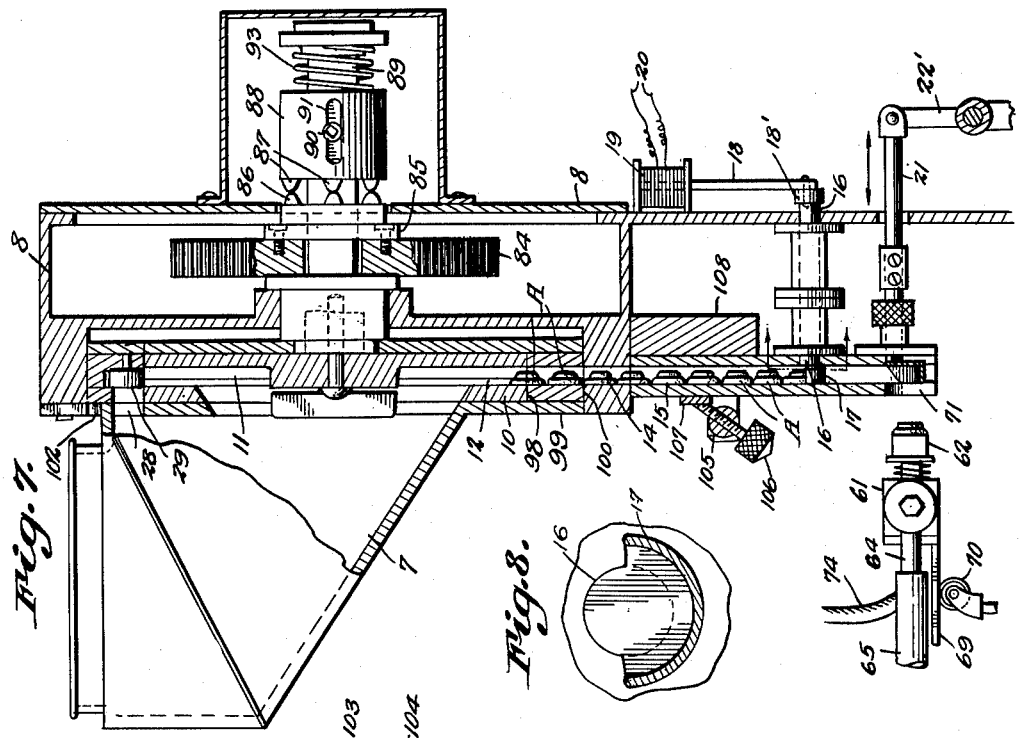
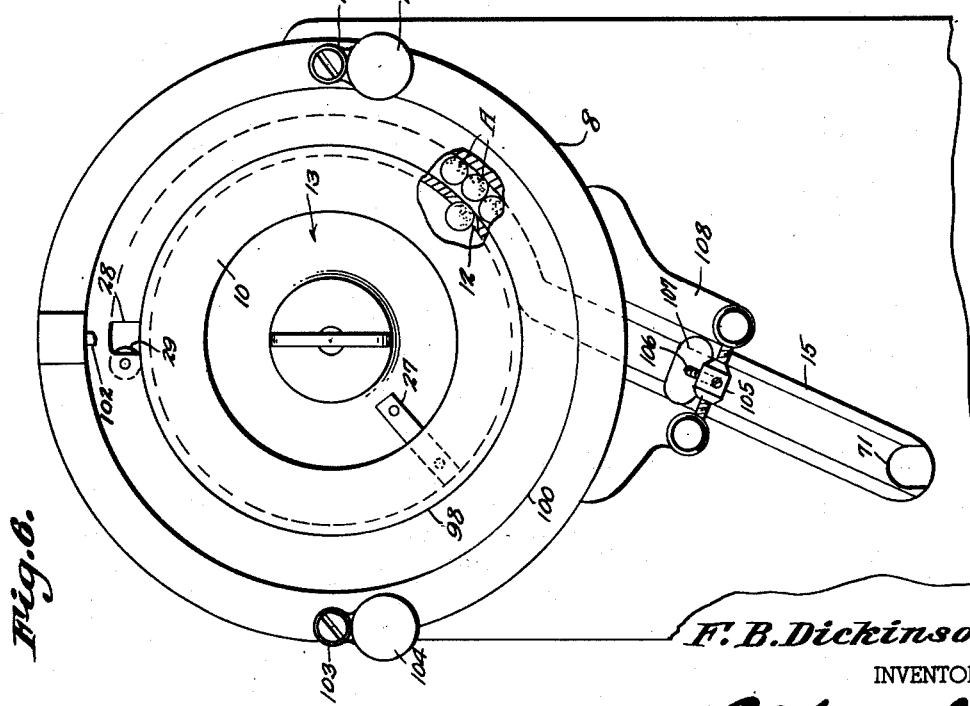
F. B. Dickinson
INVENTOR
BY C. A. Snow & Co.
ATTORNEYS.

April 21, 1953  F. B. DICKINSON  2,635,800
AUTOMATIC STOPPERING MACHINE
Filed June 2, 1950  7 Sheets-Sheet 7
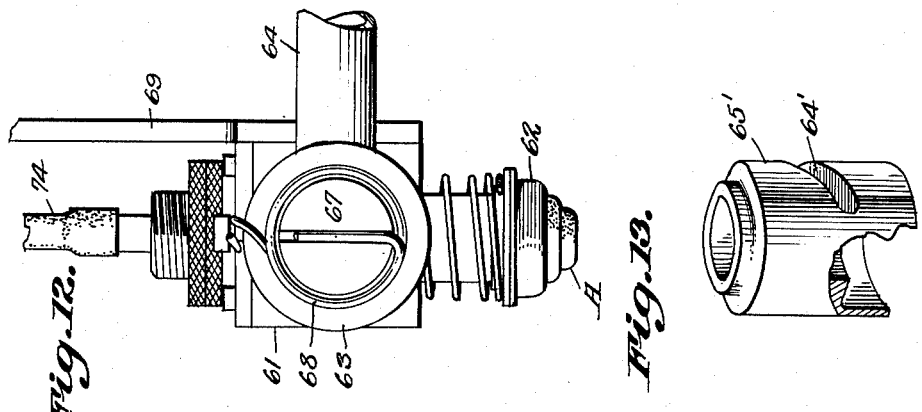
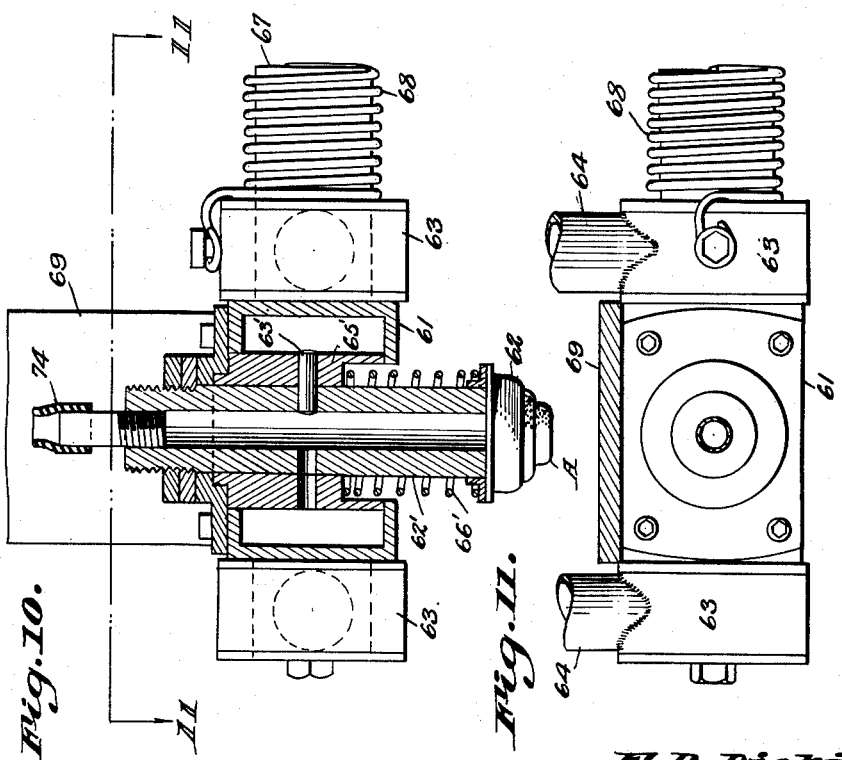
F. B. Dickinson
INVENTOR
BY C. A. Snow & Co.
ATTORNEYS.

Patented Apr. 21, 1953

2,635,800

UNITED STATES PATENT OFFICE 2,635,800

AUTOMATIC STOPPERING MACHINE

Floyd B. Dickinson, New Brunswick, N. J., assignor, by mesne assignments, to Elgin Manufacturing Company, Elgin, Ill.

Application June 2, 1950, Serial No. 165,633

3 Claims. (Cl. 226—92)

This invention relates to a machine designed for handling sterile closures in the process of their application or capping containers closing the containers, the capping operation being carried out without overexposure of the closures to air or contact with surfaces causing abrasion or contamination.

An object of the invention is to provide a hopper into which the closures are deposited and sealed, means being provided for selecting and properly arranging the closures for delivery to and passage through a chute for positioning on the containers, together with means for applying the required pressure to the closures at the proper period to press a closure onto a container which has been moved directly under the closure.

Another important object of the invention is to provide a machine of this character which will maintain sterility at all points of the hopper, segregating and chute assembly, that are subjected to contact with closures during the process of delivery from the hopper, and segregating discs, and finally through the chute.

A still further object of the invention is to provide a hopper and chute assembly so designed as to permit ready removal for purposes of sterilization, the hopper being so constructed that it will exclude foreign matter that would tend to permit growth of bacteria or other contaminating matter by enclosing the moving parts in such a way as to prevent agitation of the atmosphere in the area of the machine.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Fig. 5 is an enlarged perspective view illustrating the upper portion of the machine showing the manner of feeding the containers to positions under the stoppers.

Fig. 6 is an elevational view of the segregating disc and its housing, the hopper having been removed.

Fig. 7 is a vertical sectional view through the segregating disc and its housing.

Fig. 8 is a sectional view on line 8—8 of Fig. 7, the same being drawn on an enlarged scale.

Fig. 9 is a diagrammatical showing of the reduction gearing forming a part of the stopper feeding mechanism.

Fig. 10 is a sectional view through the applicator head.

Fig. 11 is a section on line 11—11 of Fig. 10.

Fig. 12 is an end elevational view of the applicator head.

Fig. 13 is a perspective view of the control sleeve of the applicator.

Figure 1:
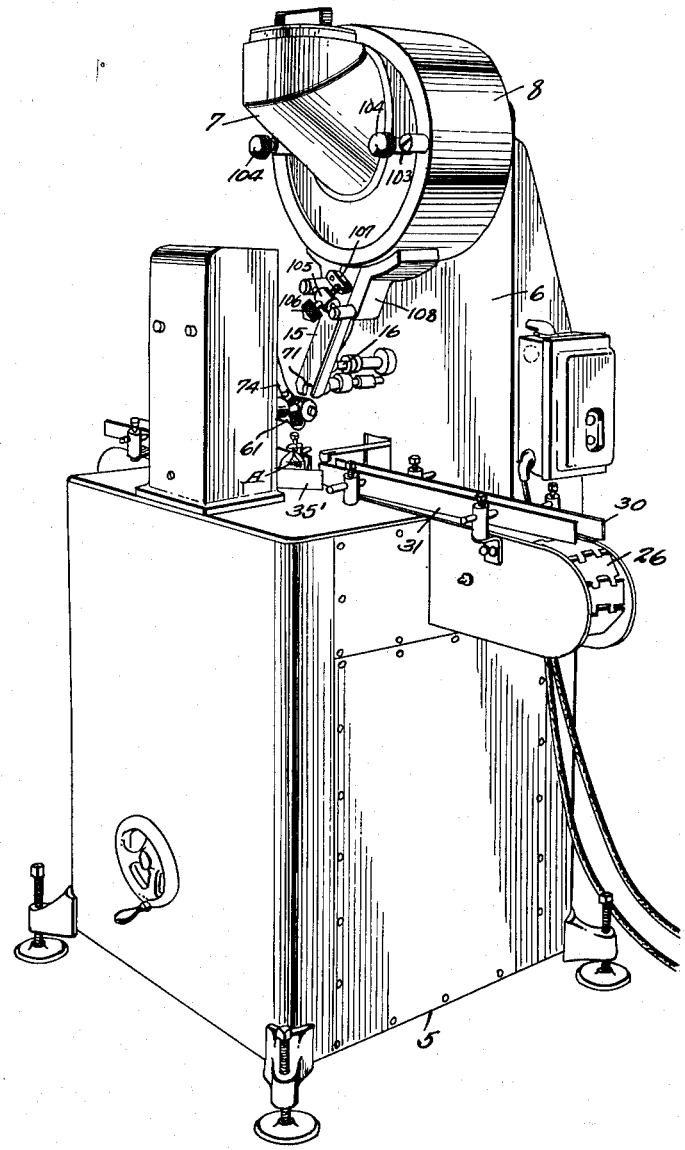
Figure 1 is a perspective view of a machine, constructed in accordance with the invention.
Figure 2:
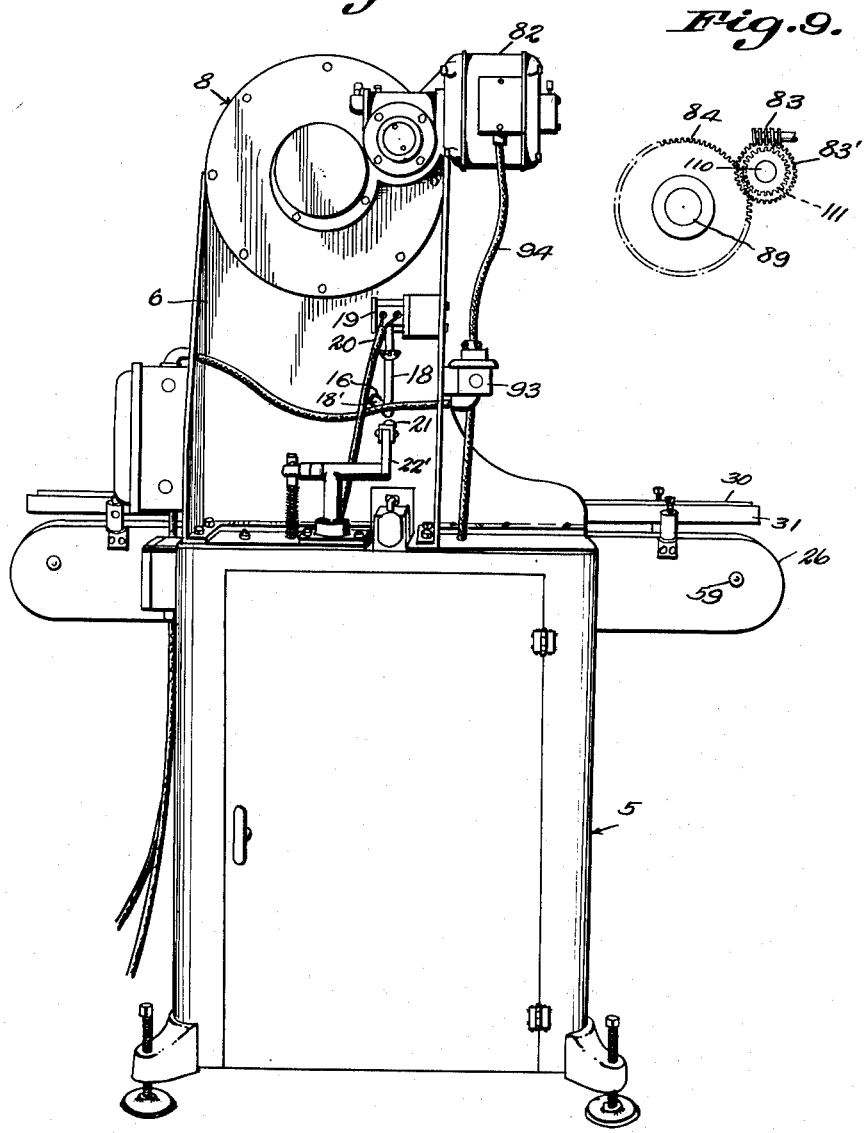
Fig. 2 is a front elevational view thereof.

Referring to the drawings in detail, the cabinet of the machine is indicated generally by the reference character 5, which cabinet is provided with an upwardly extended portion 6 which provides a support for the hopper 7 and selecting head, indicated generally by the reference character 8, the hopper 7 being in communication with the casing of the selector head, so that the closures or stoppers may be delivered into the selecting head which selects the closures or stoppers and arranges them so that they may be picked up by the applicator head and delivered into the mouths of the bottles or containers being supplied with the closures or stoppers. Mounted within the selecting head 8, and disposed between the selecting head and hopper 7, is the disc 10 which constitutes the segregating disc of the machine, the disc 10 including the ring 11 providing an annular space, which space communicates with the T-shaped openings 12 formed in the disc 10 and ring 11, which openings receive the closures or stoppers from the segregating well 13, as the disc 10 is rotated slowly.

The front wall of the selecting head 8 is recessed and the disc 10, together with the ring 11, operate in this recess. An opening indicated at 14 is formed in the selecting head 8 with which the T-shaped openings 12 communicate during the rotation of the disc 10, to permit stoppers which have been segregated from the mass of stoppers within the hopper 7, to be delivered to the T-shaped openings, to pass therethrough.

Directly under the opening 14, and communicating therewith, is the chute 15 into which the closures or stoppers fall by gravity, from the opening 14.

Extending into the chute 15, is the shaft 16 which is formed with the flanged cup 17 which provides a stop for the closures or stoppers, indicated by the reference character A, and shown in Fig. 7 of the drawings.

It will be seen that this cup rotates under the lowermost closure or stopper A within the chute 15 and when this cup is rotated from the closure or stopper, the stopper will fall by gravity to the bottom of the chute. The shaft 16 is operated by means of the arm 18' which is eccentrically connected to one end of the shaft 16, the opposite end of the arm 18' being connected to the armature 18 for the solenoid 19, which is in circuit with a suitable source of electricity not shown, through the wires 20, there being also a switch 20' in the circuit with the wires 20, the switch being operated by the rocker arm 21' mounted on the switch 20' which has a roller 22' on one end thereof, so that at a predetermined period, the cam 23' will operate the arm 21' completing the circuit to the solenoid 19 which operates the shaft 16 to drop a closure or stopper for positioning on a container.

Operating under the shaft 16, is the shaft 21 which has the blade 22 secured on the inner end thereof, the blade acting as a stop for the closures or stoppers to catch the lowermost closure or stopper and hold the stopper in position for the action of the applicator to be hereinafter more fully described. This shaft 21 is pivotally mounted at the upper end of the rocker arm 22', which rocker arm is moved by means of the arm 23 that carries the roller 24 at its inner end, the roller 24 operating over the cam 25 which causes the arm 23 to oscillate, transmitting the required oscillating movement to the shaft 21 to accomplish the purpose of the shaft. The cam 25 is supported on the main power shaft 58 of the machine. The cabinet of the machine is provided with an opening through which the endless conveyor 26 operates, the endless conveyor moving transversely of the machine. As shown, the frame in which the endless conveyor operates extends appreciable distances beyond the sides of the cabinet so that the bottles or containers may be conveniently placed thereon and removed from the endless conveyor after they have been filled.

The segregating well 13 in which the closures or stoppers are delivered, is provided with the tumbler arm 27 which extends into the segregating well to cause the closures or stoppers to tumble within the segregating well so that the closures or stoppers will be fed in the proper position to be picked up by the applicator head.

An opening indicated by the numeral 28 is provided in the wall of the hopper 7, the opening establishing communication between the hopper and T-shaped openings, so that if closures or stoppers are not fed properly into the T-shaped openings, the closures or stoppers may move through the opening 28 and return to the hopper. An idle roller 29 operates adjacent to the opening 28 and acts to direct the closures or stoppers which have not been properly delivered to the T-shaped openings, to force the closures or stoppers from the openings, returning them to the hopper.

Arranged on opposite sides of the endless conveyor 26, are guard rails 30 and 31 the guard rail 30 being held in position by means of the plate 32 which is secured to the table of the cabinet, by means of the screws 33 that operate in the elongated opening 34 of the plate 32, the plate 32 having an upstanding longitudinal flange 35 that bears against the guard rail 30.

The guard rail 31 is formed with an offset portion 35' providing a space of substantially V-shape, into which the container which is being supplied with a closure or stopper, moves to receive the closure or stopper.

The reference character 36 indicates a shuttle, which is provided with a curved bottle-engaging surface 37 that contacts a bottle as it nears the offset portion 35', and forces the bottle or container into the offset portion in a manner as shown by Fig. 5 of the drawings.

The shuttle embodies a movable frame 38 that has an upstanding end 39 which carries the finger 40 that is horizontally disposed and arranged in a line with the member 37 of the shuttle. Mounted under the shuttle 36 and secured thereto, is the roller 41 that is engaged by the cam 42 mounted on the main shaft not shown, the cam 42 operating to slide the shuttle transversely of the endless conveyor operating the shuttle.

An opening 40' is formed in the offset portion 35' of the guard rail 31, and the finger 40 carried by the upstanding end 39 of the shuttle, moves through this opening and engages the container which has been capped, moving the container outwardly from the offset portion, where the container is returned to the endless conveyor which carries the container from the machine, properly closed by a stopper.

The reference character 43 indicates the motor which is mounted within the lower portion of the cabinet, the shaft 44 of the motor extending into the housing 45 in which a suitable vacuum pump is mounted, the vacuum pump being operated by the motor and shaft 44.

Mounted on the shaft 44 is a pulley 45' over which the belt 46 operates, the belt 46 also operating over the pulley 47 mounted on one end of the shaft 48. The pulley 49 is also secured on one end of the shaft 48 and transmits movement to the pulley 50 and shaft 51, the shaft 51 extending into the gear housing 52 in which suitable reduction gearing, not shown, is housed, the gearing operating the shaft 53 on which the pulley 54 is secured. The belt 55 operates over the pulley 54 and this belt 55 operates over the pulley 55 mounted on the cam shaft, rotating the cam shaft and the various cams disposed thereon.

The pulley 57, which is mounted on the cam shaft 58, transmits movement to one end of the shaft 59, through a pulley not shown, and belt 60 operating over the pulley 57. The reference character 61 indicates the vertically movable applicator head support on which the applicator nozzle 62 is connected. The nozzle 62 is secured to the lower end of the tubular member 62' through which suction is created, to draw the cap A into position and hold the cap to the suction heat until such time that the cap A is to be inserted in a container and released.

Extending from the member 62', is the pin 63' which moves in the cam slot 64' of the sleeve 65' within which the member 62' is rotatably mounted, the sleeve being mounted in the head 61. The spring 66' is mounted on the member 62' and bears against the nozzle 62 with its opposite end engaging the sleeve 65', said spring normally urging the head 61 downwardly applying the desired pressure to the closures and at the same time compensating for movement of the head towards the container to which the cap is being applied, the member 62' rotating approximately 90° as the pressure is applied. The spring also acts to return the head and nozzle to its normal pick-up position, when pressure is relieved.

Figure 3:
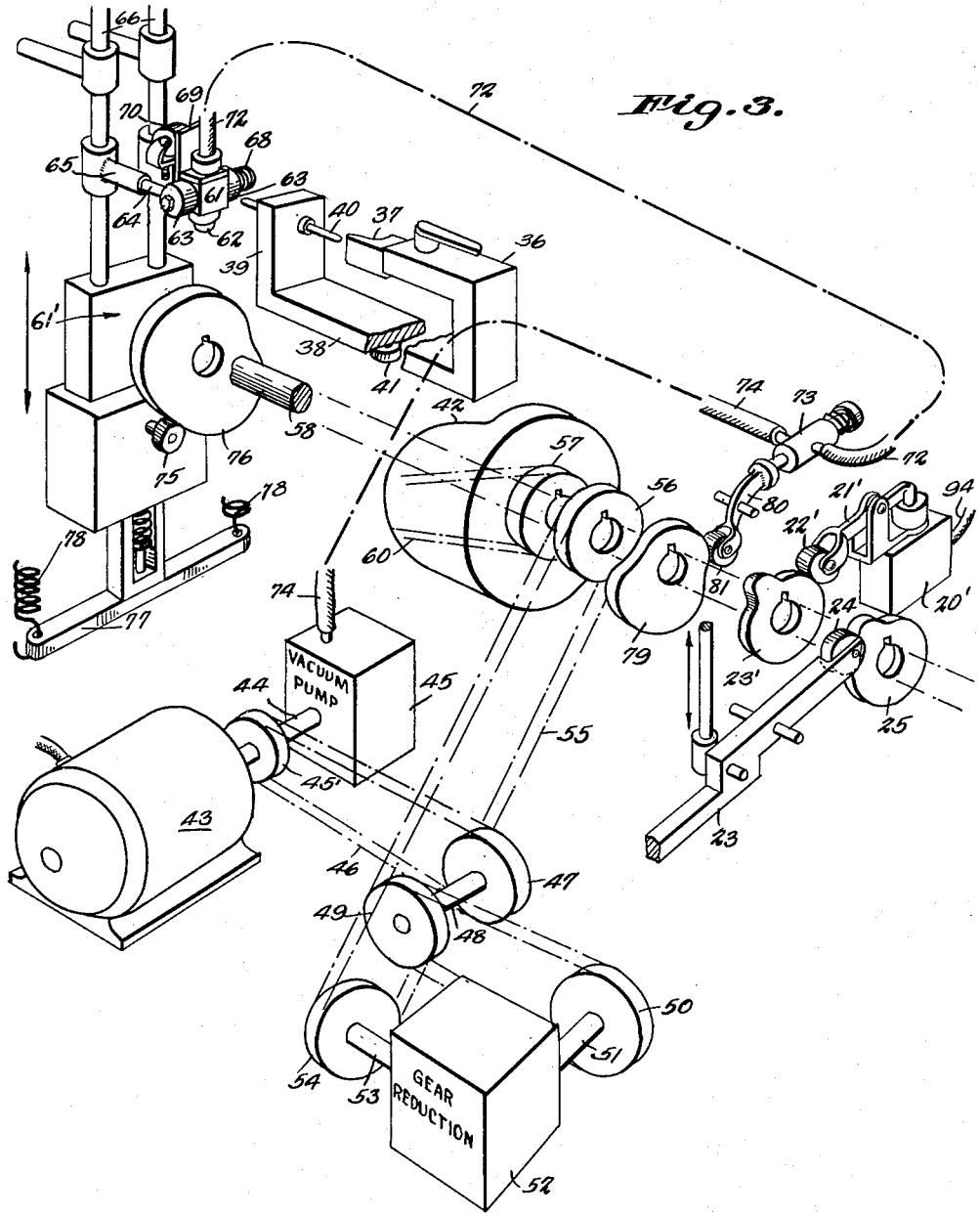
Fig. 3 is an exploded diagram illustrating the operation of the machine.
Figure 4:
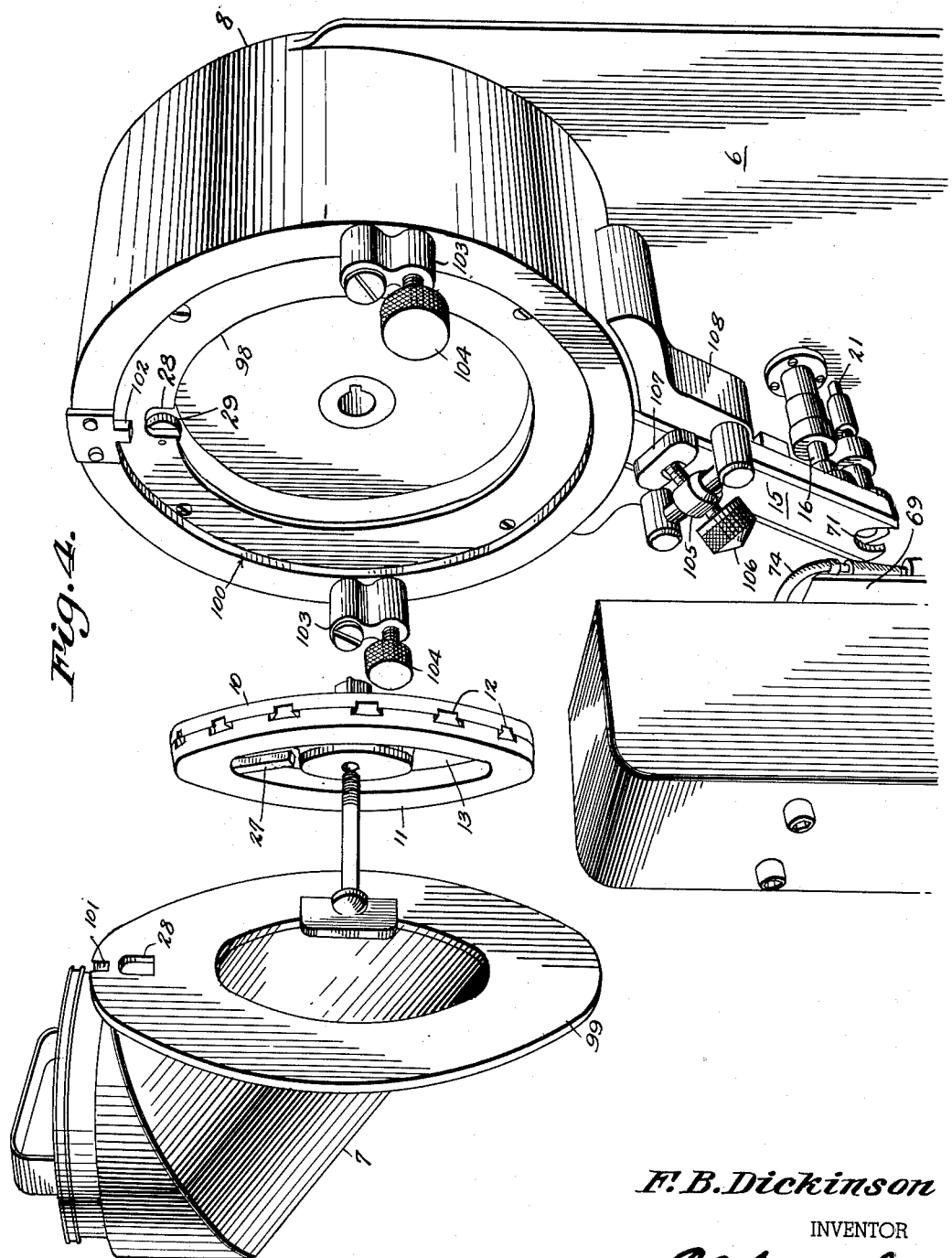
Fig. 4 is a perspective view illustrating the housing in which the segregating disc operates, together with the hopper for delivering stoppers to the segregating disc.

The nozzle 62 operates in the bearing rings 63 that are disposed at the outer ends of the supporting rod 64 that are secured within the tubular shafts 65 mounted on the vertical rod 66. The applicator head is provided with laterally extended shafts 67 on which the applicator head is secured, the shafts 67 being mounted within the bearing rings 63 for free pivotal movement. A coiled spring 68 is coiled around the laterally extended shaft 67 and is so arranged that this spring tends to rotate the applicator head to a horizontal position, as shown by Fig. 7 of the drawings. Mounted at the rear of the applicator head, is the plate 69 which is engaged by the roller 70 secured to the frame of the machine, the roller 70 being mounted on a stationary support. It is obvious that when the vertically movable applicator head support 61 moves upwardly from the position as shown by Fig. 3, the coiled springs will act to move the applicator head with respect to the bearing rings 63, the applicator nozzle 62 taking the position as shown by Fig. 7, where it is directly opposite to the opening 71 at the lower end of the chute 15.

The reference character 72 indicates the vacuum hose that extends into the applicator head and communicates with the nozzle 62, the vacuum hose being connected with the valve disposed within the valve housing 73. The hose 74 also connects with the valve housing 73, and has connection with the vacuum pump housing 45. Thus it will be seen that when the valve in the valve housing 73, is open, a vacuum will be produced through the hose 74, by the vacuum pump, causing a suction through the nozzle 62. It will of course be understood that when this suction takes place, the applicator head will have moved to the position as shown by Fig. 7, where the nozzle will be directly opposite the opening 71, to suck a closure or stopper from the chute 15, holding the stopper or closure to the nozzle.

This vertical movable applicator head support 61 is provided with a roller 75 which extends from one side thereof, the roller 75 being engaged by the cam 76 which is keyed to the power shaft or cam 58. Pivotally mounted under the housing 61', is the transverse bar 77 to the ends of which are connected contractile springs 78 that have their upper ends anchored within the housing of the machine, so that these springs 78, normally act to draw the vertically movable applicator head support, upwardly as the cam 76 rotates to bring the low side of the cam in contact with the roller 75. Thus it will be seen that with each rotation of the cam 76, the applicator head support 61 will be moved vertically with the result that the applicator head will rotate from a vertical position to a horizontal position and then be returned to its vertical position, or the position as shown by Fig. 3. The cam 79 is also keyed on the shaft 58 and is arranged directly opposite to the arm 80 that carries the roller 81 on its free end, the roller 81 moving over the cam surface so that as the cam moves, the arm 80 will be operated to control the valve not shown, which forms a part of the rod, the valve being so constructed that with each rotation of the cam 79, the valve in the valve housing 73 will be opened and closed, with the result that upon opening of the valve, the vacuum or suction will be produced through the pipes 72, 74, and housing 45, operating the mechanism for drawing a closure or cap from the chute and holding it on the nozzle of the applicator head, for positioning on a container.

The operation of the disc 10, is controlled by the motor 82, the shaft of which is supplied with the worm gear 83 that meshes with the spur gear 83' mounted on a shaft 110 journalled in suitable bearings in the said motor housing. On the opposite end of shaft 110 is mounted a smaller spur gear 111 that meshes with the gear 84 mounted within the selector head 8, the gear 84 being connected with the ring 85 to which the clutch teeth 86 are connected, the clutch teeth 86 cooperating with the teeth 87 of the clutch sleeve 88, the clutch sleeve being secured to the power shaft 89 by means of the bolt 90 which is disposed within the elongated opening 91 formed in the sleeve. The sleeve 88 is moved longitudinally of its shaft 89 by means of the coiled spring 93. Thus it will be seen that due to this construction, the shaft 89 is rotated as the gear 84 rotates, with the result that the segregating disc 10 is rotated to pick up the caps or closures from the hopper 7. Should the segregating disc for any reason, become clogged, it is obvious that the teeth 86 and 87 would ratchet, allowing rotation of the gear 84 with respect to the clutch sleeve 88 with the result that all danger of causing abrasion or shearing of the rubber stoppers is eliminated should the stoppers become clogged.

The motor 82 is in circuit with the switch 93 through the cable 94, the switch 93 being manually controlled.

It will of course be understood that these cams are so regulated and timed with respect to each other, that the various steps necessary in completing the operation of selecting and applying closures or caps to containers, will be completed, with each rotation of the shaft 58.

It might be further stated that the selecting head 8 is provided with a recessed portion 98 in which the segregating disc 10 is mounted and operates.

The hopper 7 is provided with an outwardly extended annular flange 99 that fits within the recess 100 formed within the selecting head 8, the flange 99 having a notch 101 in which the lug 102 extends, whereby the hopper 7 is held against rotation with respect to the selecting head 8.

Pivoted clamping members 103 are mounted on the selecting head 8 and are provided with screws 104 that engage the flange 99, forcing the flange into the recess 100, and securing the hopper 7 to the selecting head 8. This structure provides means whereby the hopper and segregating disc may be readily removed should it be desirable to gain access to the interior of the mechanism to move a jammed closure or cap.

The clamp 105 is mounted on the selecting head 8 and embodies a screw 106 which bears against the bar 107 that in turn contacts the chute 15, forcing the chute into engagement or close contact with the member 108 that forms a part of the selecting head 8.

In the operation of the machine, a number of the containers to be equipped with closures or caps, are positioned on the endless conveyor 26. The motor 43 is now set in operation and the cam shaft is rotated through the reduction gearing and belts operating over the pulleys rotated by the reduction gearing. A vacuum is produced in the vacuum pump housing 45. It will of course be understood that the various cams mounted on the cam shaft 58 are so timed with respect to each other that as a container moves under the applicator head due to the movement of the shuttle 36 moving the bottle-engaging surface of the shuttle into contact with the container which moves the container into the offset portion 35', the applicator head is in a position to receive a cap or closure from the opening 71 of the chute 15, the vacuum through the hose 72, sucking a closure or cap against the applicator nozzle. The vertically movable applicator head support, together with the applicator head, are moved downwardly under the action of the cam 76 moving against the roller 75, which forces the closure or cap into the mouth of the container. At this moment, the vacuum is cut off by the action of the cam 79, roller 81 and arm 80, to the end that the cap will remain in the mouth of the container. The cams are so timed that the applicator head will now move vertically and the endless conveyor is operated to move the capped container forwardly. It will of course be understood that the finger 40 moves into an opening formed in the offset portion 35' of the guard rail, forcing the capped container outwardly, where it may be carried through the machine, properly capped.

It will of course be understood that the operation of the motor will be controlled so that the capping operation will be carried out at the desired speed.

Having thus described the invention, what is claimed is:

1. A closure applicator for capping containers, comprising an endless conveyor on which containers to be capped are positioned, a closed reservoir, means for sealing a plurality of sterile closures therein, a closure selecting head mounted above said endless conveyor, means for delivering closures from said reservoir to said selecting head, an enclosed closure chute extending from the selecting head into which closures are delivered from the selecting head, means operating within the selecting head adapted to select and deliver closures one at a time into an opening at the end of the chute, a suction applicator head including a nozzle, means for rotating said head and nozzle to a position adjacent to a closure within said opening of the chute, sucking the closure into engagement with the nozzle, and means for moving said applicator head downwardly to apply the closure to the mouth of a container disposed thereunder, and timing means for timing the delivery of a closure to the mouth of the chute, the rotation of the head, the application of suction to the nozzle, and the movement of the head downward.

2. In a closure applicator for capping containers, a continuously moving endless conveyor on which containers to be capped are positioned, adjustable guard rails disposed at opposite sides of the endless conveyor, between which said containers move, one of said guard rails being offset laterally, means for moving containers from the endless conveyor into the offset portion, a suction applicator head including a nozzle, pivotally mounted above said offset portion and movable between a downward to a horizontal position, a closure selecting head, means for delivering closures to the selecting head, a chute extending from the selector head into which the closures pass, the mouth of said chute positioned adjacent the nozzle when in horizontal position, means for rotating said suction applicator head to move said nozzle to its horizontal position adjacent to the mouth of said chute opposite to the closure to be removed, means for then creating a suction through the suction applicator head sucking a closure into contact with the nozzle, means for then rotating the suction applicator head to its normal downward position over a container, means for then moving the suction applicator head downward to position the closure, held by the nozzle, into a container mouth to thereby close the container, means for forcing the capped container from the offset portion of the guard rail, onto the conveyor, and timing means for timing the operation of each of said means.

3. In a capping machine having a conveyor carrying containers and a sealed chamber holding a stock of sterilized closures for the containers, a selector for bringing said container closures one at a time from said chamber through a closed passage to a pickup position, an applicator head having a rotatable nozzle movable from vertical capping to horizontal pickup position, means for moving said head vertically, spring means effective to quickly move said nozzle to its horizontal pickup position after the head has been raised a certain distance, means for then applying suction to the nozzle to cause it to pick up a closure from the pickup position thereof, means for then lowering the head and thereby moving the nozzle to its vertical capping position over a container which has been placed thereunder, whereby said closures are maintained in sterile condition until delivered to said pickup position.

FLOYD B. DICKINSON.

References Cited in the file of this patent

UNITED STATES PATENTS

| Number | Name | Date |
| --- | --- | --- |
| 953,326 | Freyer | Mar. 29, 1910 |
| 1,553,738 | Arey | Sept. 15, 1925 |
| 1,562,599 | Suiter | Nov. 24, 1925 |
| 1,716,620 | Cherry | June 11, 1929 |
| 1,864,008 | Wright et al. | June 21, 1932 |
| 1,919,060 | Harder | July 18, 1933 |
| 1,942,885 | Tevander | Jan. 9, 1934 |
| 2,041,358 | Lidberg et al. | May 19, 1936 |
| 2,180,836 | Risser | Nov. 21, 1939 |
| 2,330,597 | Kotcher | Sept. 28, 1943 |
| 2,355,385 | Lowry | Aug. 8, 1944 |

FOREIGN PATENTS

| Number | Country | Date |
| --- | --- | --- |
| 525,201 | Great Britain | Aug. 23, 1940 |